United States Patent

[11] 3,556,278

[72] Inventor Michael L. Mastracci
York, Pa.
[21] Appl. No. 821,270
[22] Filed May 2, 1969
[45] Patented Jan. 19, 1971
[73] Assignee American Machine & Foundry Company
a corporation of New Jersey

[54] ANTI-SNAG DEVICE
5 Claims, 3 Drawing Figs.
[52] U.S. Cl. .................................................. 198/23,
198/102
[51] Int. Cl. ......................................................B65g 37/00,
B65g 47/52
[50] Field of Search............................................198/28, 102

[56] References Cited
FOREIGN PATENTS
690,858 4/1953 Great Britain................ 198/102
*Primary Examiner*—Edward A. Sroka
*Attorneys*—George W. Price and Barry H. Fishkin ABSTRACT: Materials handling apparatus which comprises a first conveyor belt, a second conveyor belt spaced from said first conveyor belt by a gap and disposed with respect thereto so as to receive articles therefrom, means mounted adjacent the gap between said conveyor belts and extending into said gap, said means including a block mounted in spaced relationship with said gap and a plurality of bristles mounted on said block and extending into said gap to substantially fill the same.

PATENTED JAN 19 1971  3,556,278

INVENTOR.
M. L. MASTRACCI

BY B.H.Fishkin

ATTORNEY

3,556,278

ANTI-SNAG DEVICE

BACKGROUND

This application relates to materials handling and more particularly to the flow of articles across conveyor interfaces.

In the field of materials handling extensive usage is made of conveyor belts to move articles from one point to another. Usually materials handling systems consists of more than one conveyor belt, the belts being arranged in an inline fashion, in a perpendicularly disposed manner, or in other fashions involving one conveyor feeding articles to another. Most often, conveyor systems comprise a plurality of the first two types of conveyor interfaces.

In the past difficulty has been encountered in moving amorphous articles and articles having strings, tags, and the like thereon across these interfaces. Since of necessity there are gaps between two conveyor belts at each interface, this has caused jamming of the conveyor belts in that these strings, tags, etc. fall into the gaps of the interfaces and get caught therein causing damage to the articles and preventing the movement of the articles thereacross.

SUMMARY

It is, therefore, an object of this invention to provide apparatus for facilitating the flow of articles across conveyor interfaces.

It is another object of this invention to preclude portions of articles from entering gaps at conveyor interfaces.

In accordance with these and other objects apparatus according to the invention may comprise means mounted adjacent the gap between two conveyor belts and extending therein, said means including a block mounted in spaced relationship with said gap and a plurality of bristles mounted on said block and extending into said gap to substantially fill the same.

DESCRIPTION OF PREFERRED EMBODIMENT

With reference to the drawings, apparatus according to the invention is shown in conjunction with a first conveyor 10 which is operable to feed articles to a conveyor 12 disposed perpendicularly thereto.

Figure 1:
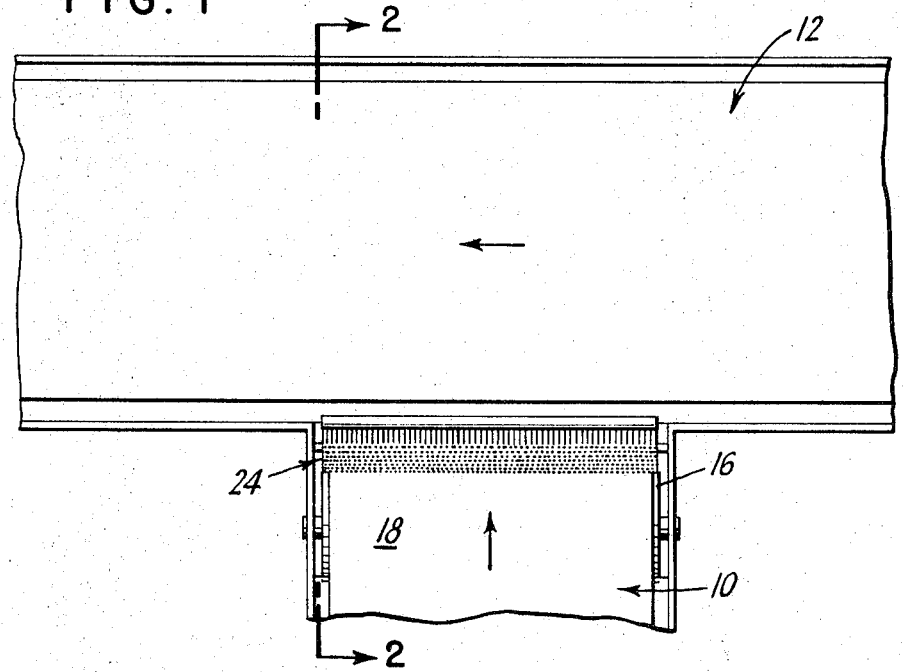
FIG. 1 is a plan view of the invention shown in association with a conveyor interface where the conveyors are disposed perpendicular to each other.

Referring in particular to FIG. 1 it will be seen that lead-in conveyor 10 is disposed at a height slightly above that of conveyor 12. This is a customary arrangement in materials handling since it facilitates the movement from one conveyor to another. While the invention is shown herein in conjunction with two conveyors disposed perpendicular to each other, it is to be understood that the invention is equally adaptable to systems where conveyors are in an inline relationship or in any other relationship where one conveyor feeds in to another.

Figure 2:
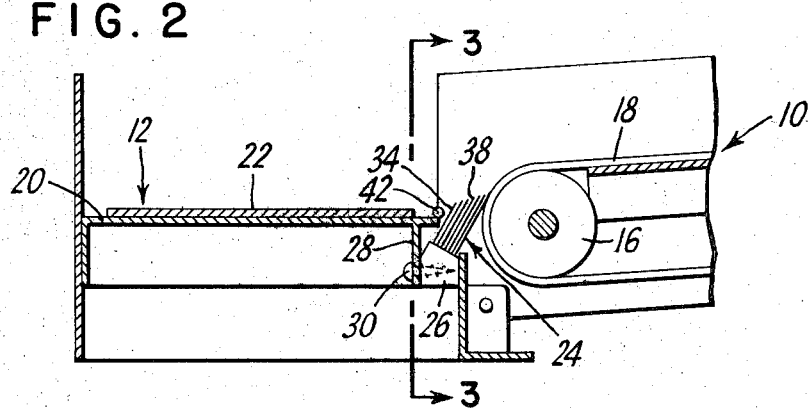
FIG. 2 shows apparatus according to the invention taken along the line 2–2 of FIG. 1.
Figure 3:
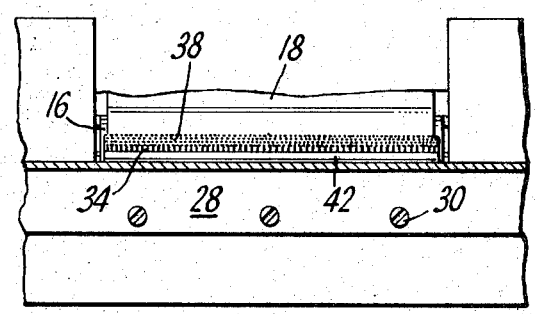
FIG. 3 depicts apparatus according to the invention taken along line 3–3 of FIG. 2.

Referring now to FIG. 2, it will be seen that conveyor 10 includes a roller 16 which, of course, is in spaced relationship with another roller (not shown). A conveyor belt 18 is mounted across the two rollers and is driven thereby. Conveyor 12 includes an upper pass 22 that is shown in conjunction with a support plate 20. The lower pass thereof and the mounting and driving rollers are not shown, such means being conventional. Conveyors 10 and 12 are arranged such that there is a gap 24 between the leading end of conveyor 10 and support plate 20. Gaps of this type are required in conveyor systems because of the fact that conveyor belt 18 is a moving element and if it impinged on support plate 20 it would soon break due to erosion. In addition, conveyor belts are not of uniform thickness and the gap allows for bulges in the belt, particularly at the splicing thereof.

The same is true of inline conveyors, where friction between two touching conveyor belts would rapidly cause their breakage. Thus, it will be appreciated that in an arrangement where two conveyors are in an inline relationship an equivalent gap would exist between the "back" end of the lead-in conveyor and the "front" end of the takeaway conveyor. The necessity for providing gaps such as 24 between conveyors gives rise to a situation wherein tags, ropes and other thin portions of articles or thin articles themselves, for example, letters, pads, or the like can fall into the gap causing a blockage, jamming and the like.

To preclude this contingency from occurring, apparatus according to the invention comprises a mounting block 26 connected in any convenient manner to the conveyor system support structure. In this embodiment, block 26 is shown attached to a support strut 28 for conveyor support 22 by screws 20. The upper surface 32 of mounting block 26 is inclined at a predetermined angle to horizontal.

A plurality of bristles 34 are mounted in block 26 perpendicularly to the upper surface 32 thereof. The bristles 34 are mounted close together and are made of a sufficiently stiff material such that the assemblage of the distal ends 38 of the bristles form a surface that is operable to effectively block the gap 24. At the same time the bristles are made of a low friction material and are flexible enough to avoid wear on the bristles 40 that are closest to the conveyor belt 18. The flexibility of these bristles 40 also allows for the deflections thereof when the thick splicing portion of the belt goes around roller 16.

The angle that upper surface 22 of mounting block 26 is inclined to the horizontal is such that strings, tags and like articles coming off conveyor belt 18 around roller 16 will impinge upon the ends of the bristles head-on. As the conveyor belt continues to run, those articles having more than a predetermined mass, will be driven into bristles 34 bending them back to a predetermined point, whereupon they spring back, advancing the articles onto conveyor belt 22. A bar 42 is mounted in back of the bristles to provide a backward limit to the flexing of the bristles in response to the movement of articles thereover.

Having now fully set forth both structure and operation a preferred embodiment of the concept underlying the present invention, it may be that various other embodiments as well as certain variations and modifications of the embodiments herein shown and described will occur to those skilled in the art upon becoming familiar with said underlying concept. All such embodiments, such variations, and modifications as incorporate the spirit of the invention and depend upon its underlying concept are consequently to be considered as within the scope of the claims appended herebelow, unless the claims by their language expressly state otherwise.

I claim:

1. Materials handling apparatus, which comprises:
   a first conveyor belt;
   a second conveyor belt spaced from said first conveyor belt by a gap and disposed with respect thereto so as to receive articles therefrom;
   means mounted adjacent the gap between said conveyor belts and extending into said gaps, said means including:
   a block mounted in spaced relationship with said gap; and
   a plurality of bristles mounted on said block and extending into said gap to substantially fill the same.

2. Materials handling apparatus according to claim 1, wherein:
   the top surface of said block is inclined to the horizontal; and
   said bristles are mounted in said block perpendicularly thereto.

3. Materials handling apparatus according to claim 2, wherein: said second conveyor belt is disposed perpendicularly to said first conveyor belt in a horizontal plane slightly below said first conveyor belt.

4. Materials handling apparatus according to claim 2, wherein: said second conveyor belt is disposed in an inline relationship with said first conveyor belt and slightly therebelow.

5. Materials handling apparatus according to claim 2, wherein: the orientation of said bristles is such that they are in alignment with objects coming around the leading roller of said first conveyor that the articles will impinge upon the ends of the bristles.